Nov. 15, 1966     R. DOWBENKO ET AL     3,285,964
PURIFICATION OF 2,3,5,6 TETRACHLORONITROANISOLE
Filed Nov. 8, 1962
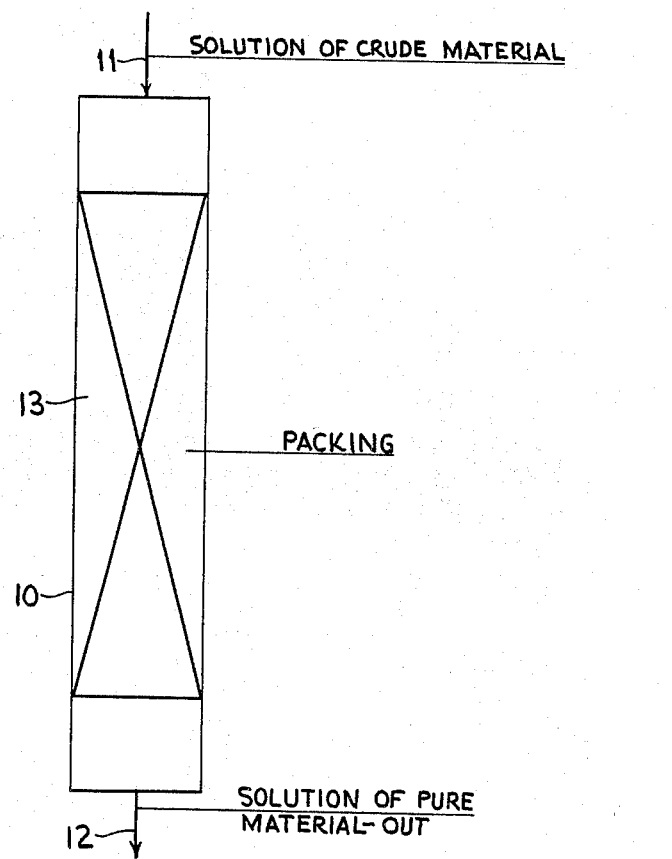
INVENTOR.
ROSTYSLAW DOWBENKO
AND WEN-HSUAN CHANG
BY Oscar L. Spencer
ATTORNEY

United States Patent Office 3,285,964
Patented Nov. 15, 1966

3,285,964
PURIFICATION OF 2,3,5,6 TETRA-
CHLORONITROANISOLE
Rostyslaw Dowbenko and Wen-Hsuan Chang, Gibsonia, Pa., assignors to Pittsburgh Plate Glass Company, Pittsburgh, Pa., a corporation of Pennsylvania
Filed Nov. 8, 1962, Ser. No. 236,338
5 Claims. (Cl. 260—612)

This invention relates to the purification of chlorinated and nitrated aromatic compounds, and it has particular relation to the purification of crude 2,3,5,6-tetrachloronitroanisole.

It has heretofore been recognized that 2,3,5,6-tetrachloronitroanisole of the formula:

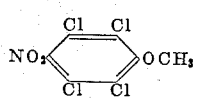

is a valuable pesticide for use upon plants and other organisms to protect them against such pests as mites and fungi. Thus, it may be used effectively against pests, including such diseases as flag smut of wheat, onion smut, apple scab, and many others.

This compound may conveniently be prepared by nitration at low temperature of tetrachloroanisole using concentrated nitric acid as a nitrating agent. It may also be prepared by nitrating tetrachlorobenzene to form dinitrotetrachlorobenzene, and then reacting the latter compound with sodium methoxide in alcoholic solution at steam bath temperature. The resultant crude products of the foregoing methods, in addition to 2,3,5,6-tetrachloronitroanisole, also contain substantial amounts of impurities, such as chloranil. Attempts to separate the desired 2,3,5,6-tetrachloronitroanisole from the impurities by conventional methods, such as crystallization using solvents such as methyl alcohol or hydrocarbon solvents as media, have not been very successful. The recovered products are still relatively crude, as is evidenced by the relatively low and unsharp melting points obtained.

This invention comprises the discovery that crude 2,3,5,6-tetrachloronitroanisole such as is obtained by the foregoing techniques, for example, by nitration of tetrachloroanisole by means of concentrated nitric acid at low temperatures and containing substantial amounts of chloranil, can be obtained in a high state of purity, as is evidenced by the relatively high and sharp melting point by passing the crude material in an appropriate solvent, such as a liquid aliphatic hydrocarbon, through a bed of pulverulent silica gel. In conducting the purification operation, various solvents for the 2,3,5,6-tetrachloronitroanisole may be used, but it is considered that aliphatic liquid hydrocarbons of an average molecular weight range of about 6 to about 12 carbon atoms per molecule are preferable. The solvent known as Skellysolve B constitutes a good commercial example of such material and it consists largely of aliphatic hydrocarbon molecules containing about 6 to about 7 carbon atoms per molecule.

In the practice of the invention, crude 2,3,5,6-tetrachloronitroanisole from various sources wherein chloranil is produced as a by-product, may be employed. One convenient method of preparing such crude product upon a microscale is illustrated in the following example:

EXAMPLE

In order to prepare the crude 2,3,5,6-tetrachloronitroanisole, a three-necked flask of about 5 liters capacity and having a glass stirrer, a thermometer and a cooling bath may be employed. Into this flask was introduced 1500 milliliters of fuming nitric acid of a minimum concentration of 90 percent, and the acid was cooled, for example, to about 5° C. or to a temperature in a range of about 10° C. to about —5° C., and 615 grams (2.5 moles) of 2,3,5,6-tetrachloroanisole was added in increments to maintain the desired temperature of the reaction mixture. This, in a specific example, required about 50 minutes. The yellow, pasty reaction mixture was then stirred at 5° C. for about 5½ hours, whereupon the product was poured into a mixture of water and ice. The resultant solid was filtered, washed well with cold water, and dried in vacuum to obtain 703 grams (96.3 percent) of crude 2,3,5,6-tetrachloronitroanisole, most of which melted at a temperature in a range of 95° C. to 100° C., although some of it had not melted at 130° C. Its infrarad spectrum showed the presence of chloranil having a doublet at 5.93 and 5.96μ. There was no evidence of the presence of the starting material in the mixture. Samples of this material were analyzed for chlorine and nitrogen, and the results were compared with the theoretical values as follows:

|  | Sample 1 | Sample 2 | Theoretical |
| --- | --- | --- | --- |
| Chlorine, percent | 50.0 | 50.7 | 48.7 |
| Nitrogen, percent | 2.83 | 4.48 | 4.81 |

A series of tests was then conducted for purposes of determining a method whereby the material could be purified.

Test A

In accordance with this test, the crude 2,3,5,6-tetrachloronitroanisole in an amount of 92 grams was dissolved in boiling methanol. The product was then allowed to crystallize off and 72.6 grams of desired solid product was recovered. This product had a melting point of 71° C. to 85° C. and infrared examination of the latter still showed the doublet at 5.93 and 5.96μ of the chloranil impurity. A second and less pure fraction weighing 10.7 grams and having a melting point of 60° C. to 70° C. was also precipitated and was filtered off.

Test B

In this test, aliphatic hydrocarbon of a molecular chain of 6 to 7 carbon atoms (Skellysolve B) was employed as the solvent medium. In accordance with the provision of the test, 70 grams of the crude material was treated with warm hydrocarbon solvent and a residue of insoluble material was filtered off. This comprised 1.2 grams of chloranil (as determined by infrared analysis) having a melting point of 285° C. to 300° C. The filtrate solution was concentrated and a solid product was deposited in an amount of 68.8 grams. This contained the 2,3,5,6-tetrachloronitroanisole and the melting point was relatively low and unsharp (70° C. to 90° C.).

It was apparent from Tests A and B that the crude 2,3,5,6-tetrachloronitroanisole could not be purified by these crystallization techniques.

Test C

In accordance with this test, crude 2,3,5,6-tetrachloronitroanisole was successfully and economically purified by filtering a solution of the crude material through pulverulent silica gel.

An appropriate apparatus for conducting the operation is shown diagrammatically in the single figure of the drawing. The apparatus comprises a column of appropriate material, indicated at 10, and being provided at its upper extremity with an inlet 11 and at its bottom with an outlet 12. The intermediate portions of the column are provided with a packing 13 of finely pulverulent silica gel, suitably packed in. In a specific run, a 600-gram portion of crude 2,3,5,6-tetrachloronitroanisole was dissolved in 3 liters of warm aliphatic hydrocarbon solvent of a molecular chain length of 6 to 7 carbon atoms. The column was packed with 300 grams of silica gel. The solution was fed through the column and the silica gel was then further washed with about 8 liters of additional warm solvent. The washing, in this instance, was continued until the eluate contained no more solvent. The desired product was recovered by evaporation of the eluate and drying of the residue under vacuum. A recovery of 532 grams (89 percent) was obtained. The resultant product was almost completely white. The purity of the product was indicated by the melting point, 100° C. to 103° C. Nitrogen analysis of this product was compared with the theoretical analysis as follows:

Nitrogen: Experimentally determined, 4.82 percent; theoretical, 4.81 percent.

The product was clearly of high purity and contained substantially no chloranil. This product was excellently adapted for use in the control of plant pests, such as flag smuts, onion smut, as well as other plant and animal pests. It will also be manifest that the purified compound is well adapted for other uses wherein 2,3,5,6-tetrachloronitroanisole of high purity is desired.

While specific examples of the invention have been set forth hereinabove, it is not intended to limit the invention solely thereto, but to include all of the variations and modifications falling within the scope of the appended claims.

We claim:

1. The method of recovering 2,3,5,6-tetrachloronitroanisole in a high state of purity from a crude mixture of the same comprising chloranil as an impurity, which comprises passing a solution of the crude material in a liquid aliphatic hydrocarbon solvent through a packing of silica gel particles and evaporating the solvent thereby recovering the 2,3,5,6-tetrachloronitroanisole.

2. A method of recovering 2,3,5,6-tetrachloronitroanisole in a high state of purity from a crude mixture of the same with chloranil as an impurity, which comprises forming a solution of the crude material in a liquid aliphatic hydrocarbon solvent containing about 6 to about 12 carbon atoms per molecule, and passing the resultant solution through a bed of silica gel particles and then removing the solvent thereby recovering the 2,3,5,6-tetrachloronitroanisole.

3. A method of recovering 2,3,5,6-tetrachloronitroanisole in a high state of purity from crude material contaminated with chloranil, which comprises passing a solution of the crude material dissolved in an aliphatic hydrocarbon containing 6 to 12 carbon atoms per molecule through a bed of silica gel particles, washing the bed with added aliphatic hydrocarbon solvent until 2,3,5,6-tetrachloronitroanisole substantially ceases to be extracted from the eluate.

4. In a method of purifying crude 2,3,5,6-tetrachloroanisole, containing chloranil, produced by the reaction of tetrachloroanisole with concentrated nitric acid at low temperatures, the steps which comprise passing a solution of the crude material in a liquid aliphatic hydrocarbon solvent through a bed of silica gel particles and then removing the solvent, thereby recovering the 2,3,5,6-tetrachloronitroanisole.

5. The method of claim 4 wherein the liquid aliphatic hydrocarbon solvent contains 6 to 12 carbon atoms.

References Cited by the Examiner

Peters et al.: Jour. Chem. Soc. (London), (1943) page 233.

LEON ZITVER, *Primary Examiner.*

B. HELFIN, *Assistant Examiner.*